United States Patent [19]
Margolin

[11] Patent Number: 4,702,552
[45] Date of Patent: Oct. 27, 1987

[54] DOCUMENT SCANNER EMPLOYING A FIBER OPTIC BUNDLE AND EXHIBITING GREY SCALE

[75] Inventor: George D. Margolin, Newport Beach, Calif.

[73] Assignee: Photon Devices, Ltd., Sherman Oaks, Calif.

[21] Appl. No.: 752,501

[22] Filed: Jul. 3, 1985

[51] Int. Cl.$^4$ .......................... G02B 6/06; G03B 27/00
[52] U.S. Cl. ............................ 350/96.25; 350/96.24; 355/1; 358/200
[58] Field of Search ............... 350/96.10, 96.24, 96.25; 355/1; 358/200; 250/227

[56] References Cited

U.S. PATENT DOCUMENTS

| | | | |
|---|---|---|---|
| 3,717,762 | 2/1973 | Grenier et al. | 250/227 X |
| 4,057,338 | 11/1977 | Yevick | 355/1 |
| 4,310,754 | 1/1982 | Check, Jr. | 250/227 X |
| 4,544,258 | 10/1985 | Takano | 355/1 |
| 4,570,063 | 2/1986 | De Bie et al. | 350/96.25 X |

Primary Examiner—Eugene R. LaRoche
Assistant Examiner—James C. Lee
Attorney, Agent, or Firm—Marmorek, Guttman & Rubenstein

[57] ABSTRACT

Coherence of an optical fiber bundle with randomly different geometries at its two ends is achieved electronically. A photosensitive array such as a Charge Coupled Device (CCD) or a Random Access Memory (RAM) is used as a sensor array to determine the addresses of the fiber at which light exits when light is sequentially directed into each consecutive fiber at the other end. The addresses are stored in a ROM and are used to provide coherence of an otherwise unordered fiber optic bundle having one end formed in a linear array, for example, and used to scan documents. More than one bit map is generated for the array of fibers by utilizing the fact that each fiber overlies a number of sensors of the sensor array. By "exposing" the sensors of each bit map for a different exposure time a pseudo grey scale image is produced with a RAM array and extended grey scale is achieved with a CCD or other analogue imaging array.

12 Claims, 9 Drawing Figures

DOCUMENT SCANNER EMPLOYING A FIBER OPTIC BUNDLE AND EXHIBITING GREY SCALE

FIELD OF THE INVENTION

This invention relates to apparatus for scanning a document and for storing an electronic representation of the document in memory for display or transmission purposes. More particularly, the invention relates to such apparatus employing fiber optic bundles.

BACKGROUND OF THE INVENTION

Copending application Ser. No. 581,085, filed Feb. 17, 1984 and assigned to Photon Devices Ltd., discloses a scanner which employs a fiber optic bundle. The bundle is constrained to a linear geometry at one end for convenience of scanning a document line by line. The opposite end is merely gathered at random into a bundle.

Coherence between the data entering the fibers at the linear end and data exiting the gathered ends of the fibers is produced electronically. Specifically, the gathered ends of the fiber are abutted against a light sensitive array such as a Random Access Memory (RAM) or Charge Coupled Device (CCD). The system is initialized by passing light into consecutive fibers at the linear array end and detecting which fiber the light exits from at the bundled end. The relationship is recorded by storing the RAM or CCD address corresponding to the fiber illuminated. The set of addresses so generated is stored conveniently in a Look-up Table or a Programmable Read Only Memory (PROM) and provides a bit map. The addresses of the bit map are interrogated each time the linear end of the scanner is moved to a next consecutive line of a document until the entire document is scanned.

During each clock cycle, the RAM is interrogated in a manner to detect the presence or absence of light at the sequence of addresses corresponding to the sequence of fibers in the linear array. The data input pattern is read out coherently in accordance with the bit map stored during an initializing procedure. Thus, coherence is obtained electronically rather than by the physical positioning of the fibers at the two ends of the bundle.

But grey scale is not achieved with the arrangements of my above-mentioned patent application without the use of such devices as CCD's which are relatively costly.

BRIEF DESCRIPTION OF THE INVENTION

The present invention is directed at achieving grey scale employing, in one embodiment, only an inherently digital light sensor such as a RAM. In this connection, grey scale is defined as the electronic representation of different levels of light intensity exiting a particular fiber.

The invention is based on the recognition that between 3000 and 4000 fibers are used conveniently to define a linear array to scan say a document eight and one half inches wide. The bundled end of those fibers are abutted conveniently against a sixty-four thousand bit RAM. Moreover, each fiber has a diameter on the order of a few mils whereas a cell of a RAM has a diameter on the order of one fifth mil. Consequently, each fiber corresponds to between ten and twenty cells of the RAM. Such a size mismatch offers a redundancy which permits imperfect RAM chips to be used, because only one cell per fiber is required to sense the presence or absence of light at that fiber position.

But that redundancy offers another opportunity which is turned to account in accordance with the present invention. That is to say, grey scale can be achieved by using that redundancy. Specifically, a number of bit maps is provided upon initialization of the system. Also, each bit map includes an address of a RAM cell associated with each fiber—a different address in each bit map. A set of cells is thus defined for each bit map. A control circuit activates the sets of cells consecutively to, in a sense, provide a sequence of exposures. Thus, the cells of a first bit map could be activated for example, one half millisecond after a linear scan period commences and the cells of a second bit map would be activated after one millisecond, and another after one and one half milliseconds and a fourth after two milliseconds. In this manner, a grey scale, say four bits deep can be generated easily in an acceptable dwell time of say two milliseconds. Accordingly, pseudo grey scale can be provided with little increase in overall exposure time.

Further advantage could be taken of a natural spread in cell sensitivity which commonly results from processing variations. Cell sensitivity during initialization could be graded and stored in bit maps of like-sensitive cells. Grey scale could be achieved with even faster overall "exposure" times by capitalizing on such sensitivity differences.

In embodiments employing CCD's, CID's, etc., which are already capable of producing grey scale, advantage may be taken of the redundant organization of the sensor array, and fiber bundle interface to extend the grey scale capability of the system by, for example, avoiding the problem of blooming which characterizes CCD operation. The term "blooming" refers to the saturation of a CCD sensor by light and the spilling over of accumulated charge carriers from a saturated CCD cell to adjacent cells. Blooming leads to a loss of resolution and information in an array of CCD's.

The invention thus utilizes an inherent redundancy between a sensor array and a fiber of an abutting fiber bundle of a system disclosed in the above mentioned copending patent application. As is described hereinbefore, that redundancy is utilized by a control circuit which is set during an initializing process which passes light consecutively into the fibers of a fiber optic bundle of a scanner, stores the addresses of the cells of the sensor array illuminated in each instance, and generates a number of bit maps each including an address of a cell of the sensor array corresponding to each fiber in the fiber optic bundle.

A control circuit is operative to activate the cells of consecutive ones of the defined number of bit maps for different lengths of time during the exposure period in which each linear segment of a scanned document occurs. The cells of each bit map thus not only provide information as to the presence or absence of light in a particular fiber during the scanning of a linear segment of a document, but also associates that information with an intensity level which is predetermined and different for the subset of cells of the sensor array associated with each bit map. The cells defined by each bit map represent a complete picture of each linear segment of a document in each instance. Thus, the images represented by the cells of all of the bit maps can be superimposed to reconstitute a complete representation of the linear segment with a depth of grey scale determined by the number of bit maps generated and the exposure time for the cells defined by those bit maps. The term "exposure time" refers to the time between the commencement of a given linear scan period and the interrogation of the cells defined by a particular bit map.

DETAILED DESCRIPTION

Figure 1:
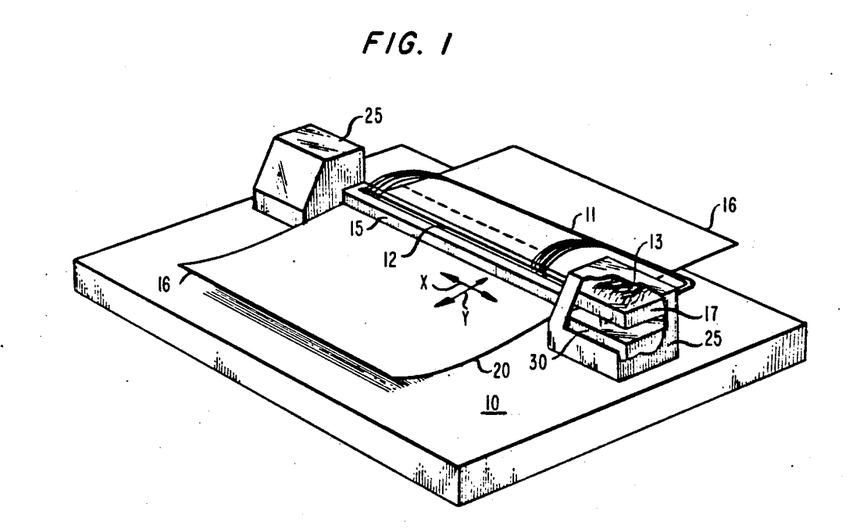
FIGS. 1, 3, and 4 are schematic representations of portions of a system in accordance with this invention.

FIG. 1 shows an illustrative portable graphics input device 10 in accordance with one aspect of this invention. The device comprises an optical fiber bundle 11 having first and second ends 12 and 13 respectively. The ends of the fibers at 12 are constrained, conveniently by ferrule 15 into a linear array positioned for scanning successive linear segments or lines of an image when moved with respect to a document 16, for example, along an axis aligned with doubleheaded arrow Y.

The ends of the fibers at 13 are not organized, but rather are gathered and bunched randomly, and conveniently fused. The fused bundle is abutted physically or focused optically in a first embodiment, onto the surface of Random Access Memory (RAM) 17. The diameter of each fiber is chosen to be large compared to the area of a bit location in the RAM, so that as many as twenty or so bits of the RAM may correspond to each fiber at end 13. The choice of size ensures that any light entering a fiber at end 12 impinges a plurality of bit locations of the RAM when it exits at end 13. The choice also ensures that a number of cells exists which is sufficient to permit a number of bit maps to be defined.

Coherence, that is, the ordered relationship, between the light signals entering the linear array of fibers at end 12 and light exiting the fibers at the bundled end 13 is ensured by storing, in a Look-up Table in a computer, or in a Programmable Read Only Memory (PROM), the address of a bit location in RAM 17 which senses light exiting a particular fiber at end 13 as light is directed into each of the fibers at end 12 in sequence.

Figure 2:
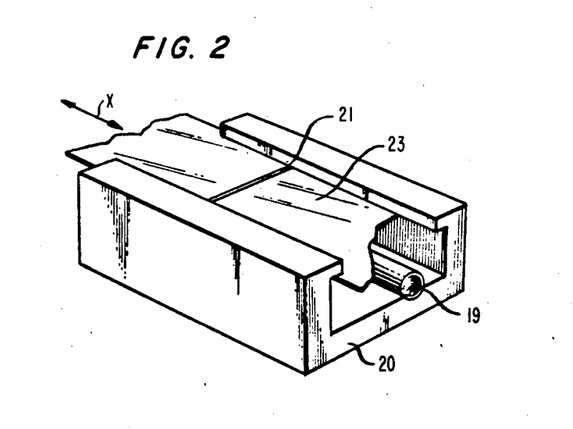
FIG. 2 is a schematic representation of a portion of an initializing apparatus for the system of FIG. 1 in accordance with this invention.

Apparatus, including a light source 19 enclosed by housing 20, is shown in FIG. 2. A side of housing 20, is placed adjacent to ends 12 during an initialization process. That side includes a slit 12 which, for example, may be formed in an opaque film or tape 23 which is moved along an axis, represented by double headed arrow X in FIGS. 1 and 2, in a manner to expose the fibers of the linear array at end 12, in sequence, to light. This causes the illumination for a sequence of bit locations or cells in RAM 17, corresponding to the sequence of fibers illuminated in the linear array. The very narrow (less than a fiber diameter) slit 21 is progressively moved along the linear array in synchronism with the interrogation of the RAM 17 so that addresses of the RAM cells illuminated in each instance, are read out and recorded. The arrangement for moving slit 21 as required may be any convenient translation mechanism suitable for this purpose, and a detailed discussion of such an arrangement is not necessary for an understanding of this invention. All that is necessary is that a slit be passed along the fiber ends at 12 to illuminate the fibers in sequence to establish an appropriate Look-up Table or Bit Map during an initialization procedure. A suitable control circuit for controlling the movement of slit 21 and for controlling source 19 is represented by circuit board 30 of FIG. 1. The apparatus to accomplish initialization can be included as part of the apparatus of FIG. 1, or may be a separate dedicated fixture as shown in FIG. 2.

Figure 3:
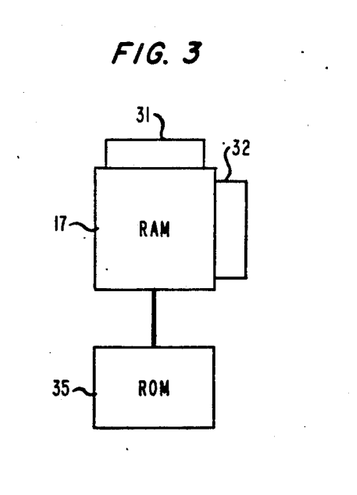

RAM 17 includes X and Y address decoders 31 and 32 in a familiar manner as indicated in FIG. 3. All bit locations in the RAM are initialized or precharged prior to each "interrogation" cycle, in which all bits are interrogated to determine which addresses were illuminated when light enters the next consecutive fiber during the initialization process. Specifically, incident light discharges the bit location (or locations) of the RAM corresponding to the fiber at end 12 which is illuminated during the initialization process. The RAM is then interrogated and the address (or addresses) of the discharged bit location (or locations) is (are) stored in the Look-up Table or Read Only memory (ROM) 35 under the control of control circuit 30 of FIG. 1. At the termination of the initialization process, the addresses of consecutively discharged bit locations of RAM 17, corresponding to consecutive illuminated fibers, are stored. This establishes the coherence between the randomly gathered fiber ends at 13 and the linear arrangement of fiber ends at 12. The system is now ready for operation.

As noted, each fiber is larger in diameter than the area occupied by a group of bit locations in RAM. This was done, as disclosed in the above-mentioned copending application to ensure that at least one unambiguous bit location in the sensor RAM would be illuminated (if its corresponding fiber end is illuminated) during each interrogation cycle, and so that a defect in the RAM would not cause loss of information. In accordance with the present invention, the redundancy of about 10 to 20 bit locations, corresponding to a single fiber, further could permit as many as 10 to 20 bit maps to be made, each including a bit location (cell) of RAM (or CCD) associated which each fiber of the array.

A suitable sensor RAM is available commercially from Micron Technology Inc., of Boise, Id. The RAM is divided into two sections, each 256 by 128 cells. Accordingly, it is convenient in the illustrative embodiment to divide the fibers at end 13 into two arrays to associate with the two sections of the RAM if the Micron Technologies RAM is used. For speed of operation, it may be desirable to divide the fibers into a greater number of arrays to reduce the addressing requirements.

A complete system for entering graphics information into a computer is disclosed in detail in the September 1983 issue of Byte Magazine, and the computer interfaces and control software for the system are provided in the October issue of that same publication.

Figure 4:
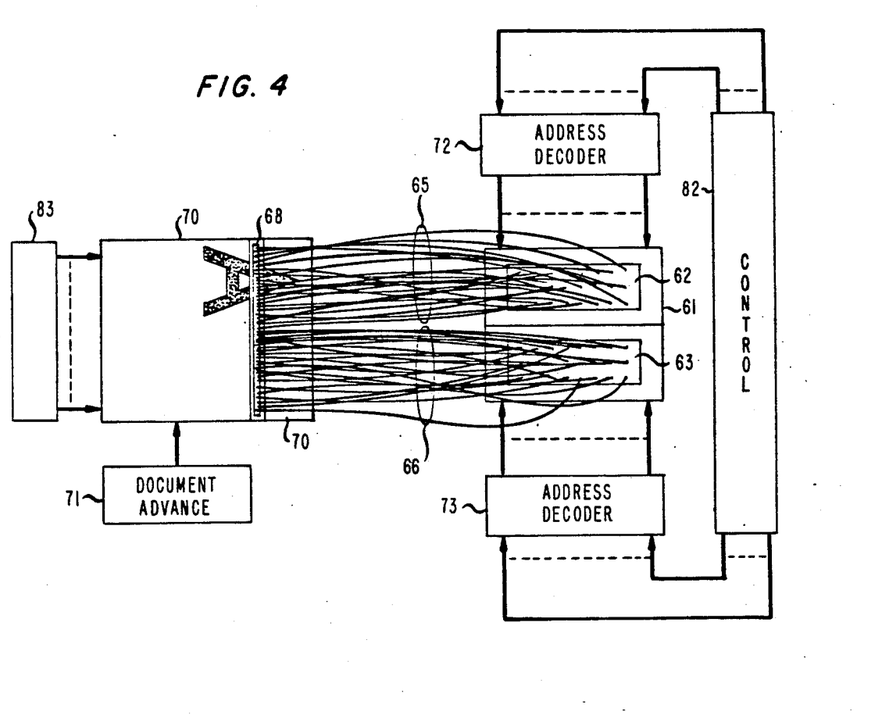

FIG. 4 shows schematically an arrangement of the type shown in FIGS. 1 and 3 for use with the system of the above-mentioned publications. The arrangement includes RAM chip 61 divided into two sections 62 and 63 as is available commercially. Sections 62 and 63 are mated with randomly-bundled fiber arrays 65 and 66 respectively. The other ends of the fibers are constrained to a linear geometry by ferrule 68 and positioned to scan a portion of a document, shown by way of illustration as the letter A on document 70. A means for advancing document 70 is represented by block 71 and may comprise, for example, a mechanism like that used in the Houston Instruments DMP-4 plotter. Houston Instruments is a division of Bausch & Lomb. RAM 61 is addressed by address decoders 72 and 73 under the control of a Look-up Table implemented as part of a computer or by a familiar PROM providing a bit map. The addressing control arrangement is represented by block 82.

Figure 5:
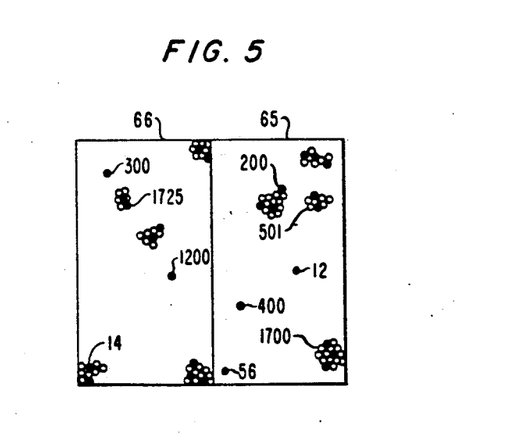
FIGS. 5, 7, and 8 are schematic representations of random distribution of light signals in a non-coherent fiber bundle.

The linear array in FIG. 4 is shown intersecting a letter A on document 70. In the absence of a Look-up Table or Bit Map, noncoherence between the input and output array produces a random distribution of the light signals input to the linear array of fibers. That distribution is shown as it appears from the output as represented in FIG. 5. FIG. 5 specifically, represents the random distribution by numbers of associated fibers in the linear array placed with respect to possible positions of the associated other ends of those fibers in arrays 65 and 66. It is clear that the interrogation of RAM sections 62 and 63 could make no sense of the input signals in the absence of a Look-up Table.

But a Look-up Table or Bit Map which stores the relationship between the input of fibers 1,2,3,—and the addresses of bit locations in RAM 61 associated with the output ends of those fibers, enables sense to be made of the random distribution by controlling the RAM address decoders to take the output sensed at the stored addresses in a sequential relationship identical to that in the linear array. Further, each of a number of bit maps, each storing that relationship, also enables sense to be made of the random distribution. Consequently, during a scan period when light directs signals into the fibers at 68, in FIG. 4, from a linear segment of the document, each of the Look-up Tables or Bit Maps, included in control circuit of FIG. 4, applies a set of addresses to interrogate the memory, in order to generate output signals coherent with the fiber positions at 68. But, in accordance with the present invention, the cells of different bit maps are interrogated at different times after the commencement of a linear scan period. Next, document 70 is advanced incrementally with respect to ferrule 68, and RAM 61 is interrogated again in accordance with the plurality of Look-up Tables or Bit Maps. The process is repeated until the document is entirely scanned. The apparatus of FIG. 1 includes a lamp (not shown) for illuminating the document. Provision for illumination may correspond to that provided in any familiar copier. The illumination means is represented by block 83 in FIG. 4.

The following Table represents first, second and third Look-up Table or Bit map fragments for an illustrative six fibers. It should be clear that the operation of the RAM interrogation according to each Look-up Table during each scan period is entirely consistent with the operation described in the above mentioned publications. The results, however, are considerably different, because the optical input received by the RAM during each interrogation is effectively a randomly dissected linear input distributed over the ENTIRE RAM—instead of a line from the array being laid out on a line of the sensor, as it would be in the case of a direct lens projected image. It is clear that resolution is significantly improved. It is also clear that the optical input, during each interrogation, from the subset of locations corresponding to each bit map, are identical except for intensity. When these "images" of different intensities are superimposed, a composite "pseudo" grey scale image of high resolution results.

| | Look-up Table Fragment Diagram | | |
|---|---|---|---|
| Input Array Fibers | Output Array Associated RAM Addresses 1st Bit Map | Associated RAM Addresses 2nd Bit Map | Associated RAM Addresses 3rd Bit Map |
| 507 | 4122 | 4124 | 4126 |
| 508 | 73 | 75 | 77 |
| 509 | 2413 | 2415 | 2417 |
| 510 | 62117 | 62119 | 62121 |
| 511 | 12540 | 12542 | 12544 |
| 512 | 989 | 991 | 993 |

The input fiber numbers shown above, constitue, illustratively, a fragment taken from the 0–3025 fibers and show three related RAM address for each fiber. The RAM addresses are chosen from the 10 or 20 addresses corresponding to a given fiber in such a way that the chosen address for each fiber in a bit map is many cells away from the RAM address of nearby fibers and the addresses for the same fiber in different bit maps are, arbitrarily, two addresses apart.

The operation of a scanner embodying the principles of this invention can be understood by proceeding as follows: First the linear end of the fiber bundle is juxtaposed with a first line of a document to be scanned. A light source illuminates the document (possibly by being strobed), and the storage means for storing the Look-up Tables or Bit Maps is activated for applying the sequence of stored addresses to the RAM in order to provide several readings of the incoming light signals (presence or absence of light) in each of the sequence of fibers corresponding to the set of RAM addresses interrogated according to each of the bit maps. Since the generated sequence of RAM addresses corresponds to the sequence of fibers in the linear end of the bundle, in each instance, the light signal outputs are coherent for the cells of each bit map. These output signals are stored in memory, or transmitted, or both, in a manner entirely consistent with the teachings of the above mentioned Byte Magazine articles.

We have now described the general organization and operation of a scanner utilizing a randomly organized fiber bundle along with an electronic means for achieving coherence with more than one associated bit map. Now we will describe the electronic organization of the scanner.

Figure 6:
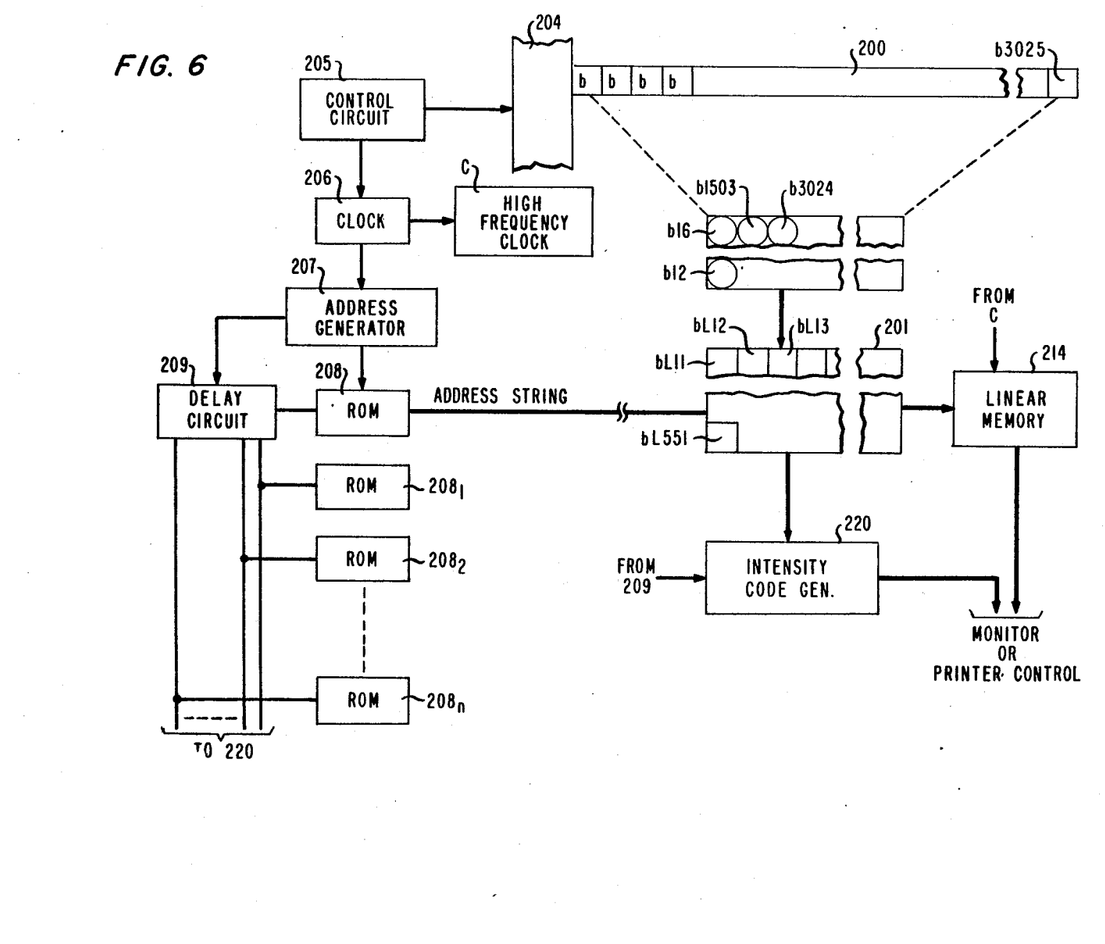
FIGS. 6 and 9 are block diagrams of the electronic organization of the system of FIG. 1.
Figure 7:
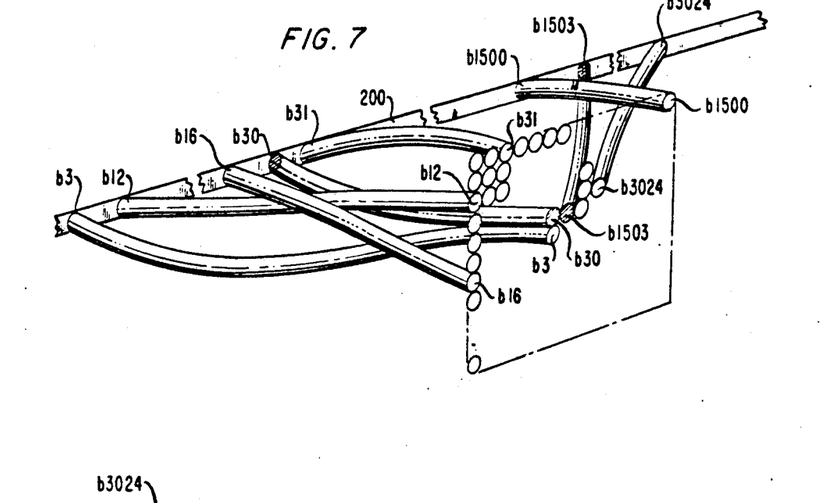

FIG. 6 is schematic block diagram of the organization of the scanner of FIG. 1. Rectangle 200 represents a linear segment (line) of a document illustratively 8.5 inches long and one fiber wide. The blocks within the linear segment are numbered from left to right as viewed in b1, b2, b3,—b3025. The light pattern entering from the linear segment of the document is, of course, scrambled when it exits the other end of the fiber. FIG. 7 represents such a scrambling. In the figure, representative fibers along the linear segment are shaded, b30, and b1503, and others, b3, b12, b16, b31, b1500 and b3024 are shown unshaded to represent dark and light areas along the linear segment respectively. The remote (bundled) end of the fibers is designated to correspond. The lack of coherence is clear.

Figures 8, 9:
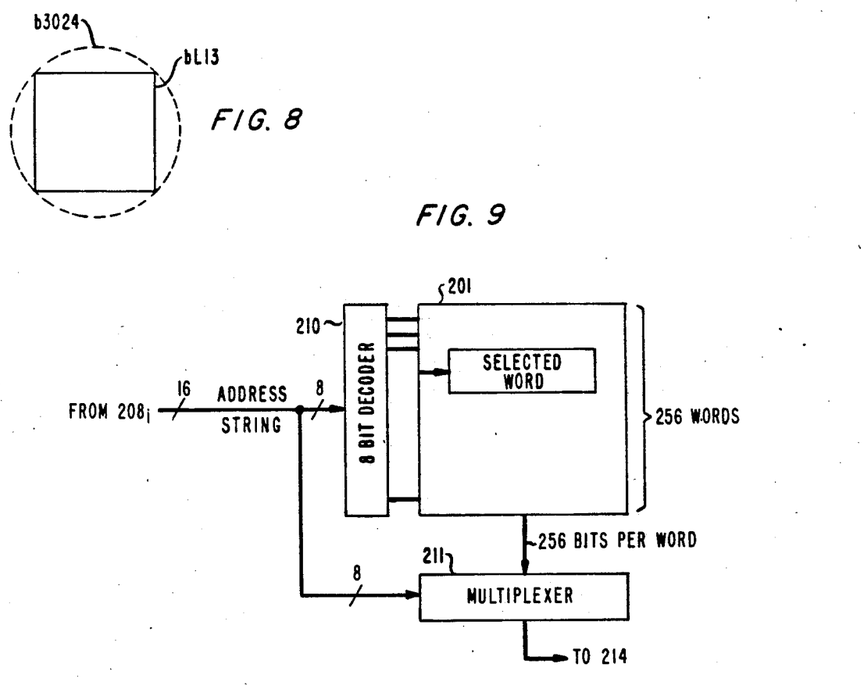

The bundled end of the fibers is attached (in one embodiment) to the face of random access memory RAM 201 in FIG. 6. RAM 201 is organized illustratively, into fifty five rows of fifty five blocks of bit locations which, when multiplied out yields 3025, the number of fibers chosen in FIG. 6. Consequently, each fiber in the bundle corresponds In position to one of the blocks of bit locations in RAM 201. FIG. 8 shows a representative fiber b3024 superimposed on a representative block designated bl13 for the first row in the third column.

The linear end of the fibers is moved, with respect to a document, as indicated in FIG. 1 by a suitable mechanical arrangement represented by block 204 in FIG. 6. One suitable mechanical arrangement is shown in the above-mentioned U.S. Pat. No. 4,332,458. The mechanical arrangement is operated under the control of a control circuit 205 which is clocked by clock source 206 of FIG. 6.

Clock source 206 also enables the generation of a plurality of strings of RAM addresses each corresponding to the sequence b1, b2, b3 . . . b3025 of the linear array end of the fibers. To this end, the scanner of FIG. 6 includes an address generator 207 for producing a sequence of consecutive addresses. The output of address generator 207 is connected to a plurality of read only memories (ROMs) $208_1$ ($208_1$, $208_2$, . . . $208_N$) via a delay circuit 209. Delay circuit 209 may be implemented by a five stage ring oscillator and a logic circuit which provides the inputs to the ROMs and the RAM. The output of each stage of the oscillator is associated with a different ROM with the remaining stage output used as a toggle. The logic circuit activates the ROMs in the sequence, say, 4-3-2-1 and then 1,3,2,4 providing the requisite delay.

The outputs of delay circuit 209 are operative to interrogate the ROM's in sequence so that each generates an appropriate string of RAM addresses. An output from clock 206 is connected to address generator 207 and is operative to initiate the timed sequence of interrogations. Each clock pulse also is operative to activate control circuit 205 to move the linear array to a next scan position and simultaneously to initialize address generator 207. Each clock pulse thus causes the address generator to scan through the 3025 bit map addresses stored in each ROM.

Each ROM responds, in a well understood manner, to generate an address string corresponding to the sequence of fibers at the linear array end as stored during initialization. The address string is applied to RAM 201 by means of an eight bit decoder 210, as shown in FIG. 9. The decoder is operative, in the usual manner, to select a particular word in RAM 201. Each time a clock pulse occurs, the linear end of the array scans a next linear segment of the document and ROM's $208_i$ apply sequences of address strings to decoder 210. Each address of each address string selects a word in RAM 201 and applies the 256 bits of the selected word to multiplexer (MUX) 211. MUX 211 is a 256 to 1 MUX and is operative to apply a binary 1 or 0 to linear memory 214 of FIG. 6 depending upon whether the selected block of bit addresses (i.e., bL13 of FIG. 8) was illuminated or not in the instant scan period. Linear memory 214 also receives relatively high frequency clock pulses via clock C activated by clock 206 for incrementing to a next of fifty five positions, each for storing fifty five bits (1 or 0) representing the presence and absence of light incident upon the consecutive blocks (bL13 of FIG. 8) addressed by the address string during each scan period. Since several address strings are applied during the scan of each linear segment, this procedure repeats to generate several representations of each linear segment, the several strings of addresses being applied within a couple of milliseconds dwell time to scan each linear segment. Electronics operative in the tens of nanosecond range permit such operation.

Linear memory 214 is capable of storing 55×55 bits for each bit map. The combined stored data provides 55×55 grey scale code words. The memory can be implemented, for example, by N 3025 bit shift registers for N level grey scale or N bit maps. The shift registers are connected serially. After each scan of a linear segment of a document, the shift registers contain N line images. The first 3025 read operations of RAM 201 (the first bit map) operate to shift the registers 3025 times yielding 3025 N bit grey scale words corresponding to the last scanned segment, each time a new segment is scanned.

Note that the 3025 fibers cover virtually the entire RAM. Thus, the 64k bits of the RAM are organized into 3025 blocks as already indicated. Consequently, each fiber corresponds to a plurality of bit locations as stated hereinbefore. It is convenient to take the address of the center bit location of the block in each instance rather than having to interrogate all the bit locations. (The center bit location will also generally be fully illuminated when the corresponding fiber is illuminated, unlike the edge bit locations which may be only partially covered. Thus illumination of the center bit is more reliably correlated with illumination of the fiber.) If we use a sixteen bit address from generator 207 of FIG. 6, eight bits of the address select the row of the RAM and eight bits select the column. But we can take six bits to select a block in a row and six bits to select a block in a column, leaving two bits in each instance. The remaining two bits determine the offset from the corner of the selected block to the approximate center of that block. In this manner, the address of the center of a block is identified with relatively few address bits. Similarly, the addresses in a plurality of address strings can be represented in terms of such an offset.

Operation of the system of FIG. 1 produces, say four bit maps stored in memory. Each bit map contains the addresses of a subset of cells (bit locations) of the sensor array which correspond to all of the fibers at the bundled end. The cells associated with each bit map sense radiation exiting all the fibers at the bundled end. Consequently, when the addresses of a particular bit map are selected, a complete representation of the signals from the fibers at the bundled end is generated. Thus, when the addresses of the four bit maps are selected in sequence, four representations of the signals are generated. Since the addresses of the four bit maps are read out at four different exposure times, the representations also comprise four different integrated light intensities. That is to say, a memory is provided to store the four representations as "images" of the signals. Those images are stored along with four codes which represent the four different intensities to which the images correspond. The intensity codes are stored in intensity code generator 220 of FIG. 6. The outputs of the code generator serve to control the grey scale of the output image associated with the linear memory outputs from bit locations designated by each bit map.

Those images are superimposed when the signals are represented visually, either during display (on a monitor) or printing so that the composite image generated, exhibits grey scale values. This can be true when the images are transmitted to a remote facsimile device also.

Of course, once graphics information is stored in a computer (most personal computers with graphics capability should be adequate here), that information can be manipulated to provide editing prior to printing. This can be accomplished through already available graphics software. The size of the document also can be reduced (or enlarged), providing a capability similar to microfilm.

In addition, a scanner employing a fiber bundle in accordance with the principles of this invention can be quite small and thus portable. The entire scanner can be configured like a wand so that, together with a feed sensing mechanism and light source, an assembly approximately ½ inch by 3 inches by 9 to 10 inches may form an entire copier, for graphic input or Optical Character Recognition (OCR) applications.

The invention has been described in terms of a RAM which is inherently binary. As has been mentioned hereinbefore, inherently analogue devices such as CCD's can be used instead. In such cases, the use of redundancy due to the correspondence of many CCD cells to a single fiber permits an extensive of grey scale over and above what could be achieved with a CCD array alone, for example.

Grey scale capabilities of CCD's, for example, are limited. This limitation is due to the familiar dark currents which characterize such devices particularly at room temperatures. Because of these dark currents, CCD's are rated at about eight bits of grey scale. At cryogenic temperatures, twelve bits of grey scale or better can often be achieved.

For high density films such as those used with x-ray recording, more than eight bits of grey scale would be required for an array of CCD's utilized to digitize the film's image in a manner to do full justice to the film's capabilities. The technique herein disclosed permits, for example a modest eight bits of grey scale, but permits the eight bits to be achieved at each of a group of different exposure times. Although, overlap may occur, if closely timed exposures are chosen, an extended grey scale (ten bits deep or more) is achieved by overlaying or superimposing different times for each exposure. For example, for a two millisecond overall exposure time period, one half milliseconds between four separate "exposures" controlled by four bit maps as in FIG. 6 provides a grey scale of eight bits for high exposure and a grey scale of eight bits for each of the other exposures, thereby extending the total range captured. This can provide ten bits without the size and expense of more costly sensors or cryogenic apparatus.

A further advantage of the "staggered exposure" array disclosed herein is that the problem of CCD "blooming" effects are mitigated if not eliminated altogether. The reason for this is that blooming is caused by charge spill over from a saturated cell to next adjacent cells thus causing loss of detail. But, adjacent cells are not read out together in accordance with the present invention. Instead, spaced apart cells are read out - cells too far apart to be affected by blooming. Consequently, even inherently analogue devices capable of providing grey scale, provide extended grey scale capabilities herein. More important regarding reduction in blooming effects is the fact that those segments of the image that are highly saturated (brightly lit) will be selected from that bit map with the shortest exposure, thereby greatly reducing image spillover.

Of course, a scanner in accordance with the principles of this invention can employ three sequential rows of fibers each as described above and each associated with a different RAM. Each row would then have a fiber associated with each pixel but at a different exposure time. The light signal sensed at the exit end of each of the fibers can then be combined in any elected logical manner to provide a representation of the light intensity of the image value for the associated pixel. The three rows even can be taken to represent red, green and blue for color applications. In an embodiment of this type, three rows of fibers such as that row constrained by ferule 68 of FIG. 4 are abutted against one another across page 70. The other ends of the fibers are associated with RAM chips such as 61 of FIG. 4. It is clear that as page 70 is incremented, the corresponding fibers of consecutive rows becomes aligned with a particular pixel in three consecutive time periods so that the outputs of the three fibers represent the light at that pixel.

Also, the fibers of the three rows above can actually be located in the same row interleaved in three sets, 1,2,3,1,2,3..., for example. But still all the first fibers are bundled at the exit end and associated with a first sensor (RAM or CCD) array whereas all the second fibers and all the third fibers are associated with the second and third sensor arrays respectively. Timing is simplified in this embodiment over the three row embodiment. The three fibers (1,2 and 3) for any pixel, of course, must fit within the chosen pixel size.

As mentioned hereinbefore, other techniques aid in achieving grey scale. The RAM cell sensitivity spread can be capitalized upon, for example, by initializing more than once at different light intensities and storing the addresses of sets of cells with different light sensitivities. The natural spread in sensitivities provides a built in grey scale capability. Also, not all the cells associated with a single fiber may be illuminated at some low light intensity while all are at high intensities. The averaging of the outputs of the cells may provide further grey scale capabilities.

What is claimed is:

1. In combination, a fiber optic bundle having first and second ends arrayed randomly in first and second geometries respectively, means for directing input radiation signals representative of data at the fibers of said first end, utilization means cooperative with said fibers at said second end, and electronic control means for associating the signals exiting from said second end with the corresponding input signals at said first end in a manner to preserve coherence therebetween, said electronic control means being adapted to provide redundant sensor means in N subsets each having at least one sensor for each of said fibers, said electronic control means comprising means for activating said N subsets for N different time periods in a manner to generate N like representations of said input signals, and means for associating said N like representations with N different radiation intensities corresponding to said N different time periods.

2. A combination in accordance with claim 1 including means for constraining the fibers of said first end into a first geometry which comprises a linear array.

3. A combination in accordance with claim 2 including means for constraining the fibers of said second end into a rectangular array.

4. A combination in accordance with claim 4 wherein said electronic control means comprises memory means for associating the location of each fiber at said second end with a corresponding fiber at said first end.

5. A combination in accordance with claim 5 wherein said control means includes a Random Access Memory (RAM), said RAM being responsive to radiation signals for providing the addresses of cells at locations therein exposed to radiation sequentially, and said control means comprises means for generating said addresses sequentially in response to a first signal.

6. A combination in accordance with claim 5 also including means juxtaposed with the fibers of said first end for moving a document with respect to those fibers in response to said first signal, and radiation means for exposing at least a linear segment of said document for generating said first signals.

7. A combination of elements comprising a fiber optic array having first and second ends, means for constraining the first ends of said fibers into at least one linear array in a manner to permit exposure of said fibers to electromagnetic radiation, at least a first radiation sensing means comprising a plurality of sensing elements having discrete addresses and organized in an array having a surface with a first area, said second ends of said fibers being bundled randomly into an area less than or equal to said first area and associated with said surface, storage means for storing the addresses of said sensing elements in N subsets each including sensing elements which correspond to the positions of the first end of said fibers in said linear array, means for activating said elements of said array, and means for interrogating said elements of said N subsets at N different times in a manner to create N representations with N different radiation intensites 8. A combination in accordance with claim 7 also including first means for moving said linear array transversely with respect to an initial linear reference position.

9. A combination in accordance with claim 8 wherein said first means comprises means for moving said linear array incrementally with respect to a sheet of paper on which said initial linear reference position is defined.

10. A combination in accordance with claim 9 also including means for applying to said storage means said sequence of addresses in subsets between consecutive ones of said incremental movements of said linear array, storage means responsive to said addresses for storing signals representative of the presence or absence of radiation in the associated fiber at said addresses in subsets, and means for providing a coded indication of the light intensity associated with outputs from said storage means associated with each of said subsets.

11. A combination of elements in accordance with claim 10 wherein said means for constraining constrains said first ends of said fibers into first, second and third rows, said combination also including first second and third sensing means associated with the second ends of said rows of fibers respectively.

12. A combination of elements in accordance with claim 10 said combination also including first second and third radiation sensing means, said fibers being organized into first second and third interleaved sets said sets having second ends associated with said first second and third sensing means respectively.

* * * * *